UNITED STATES PATENT OFFICE.

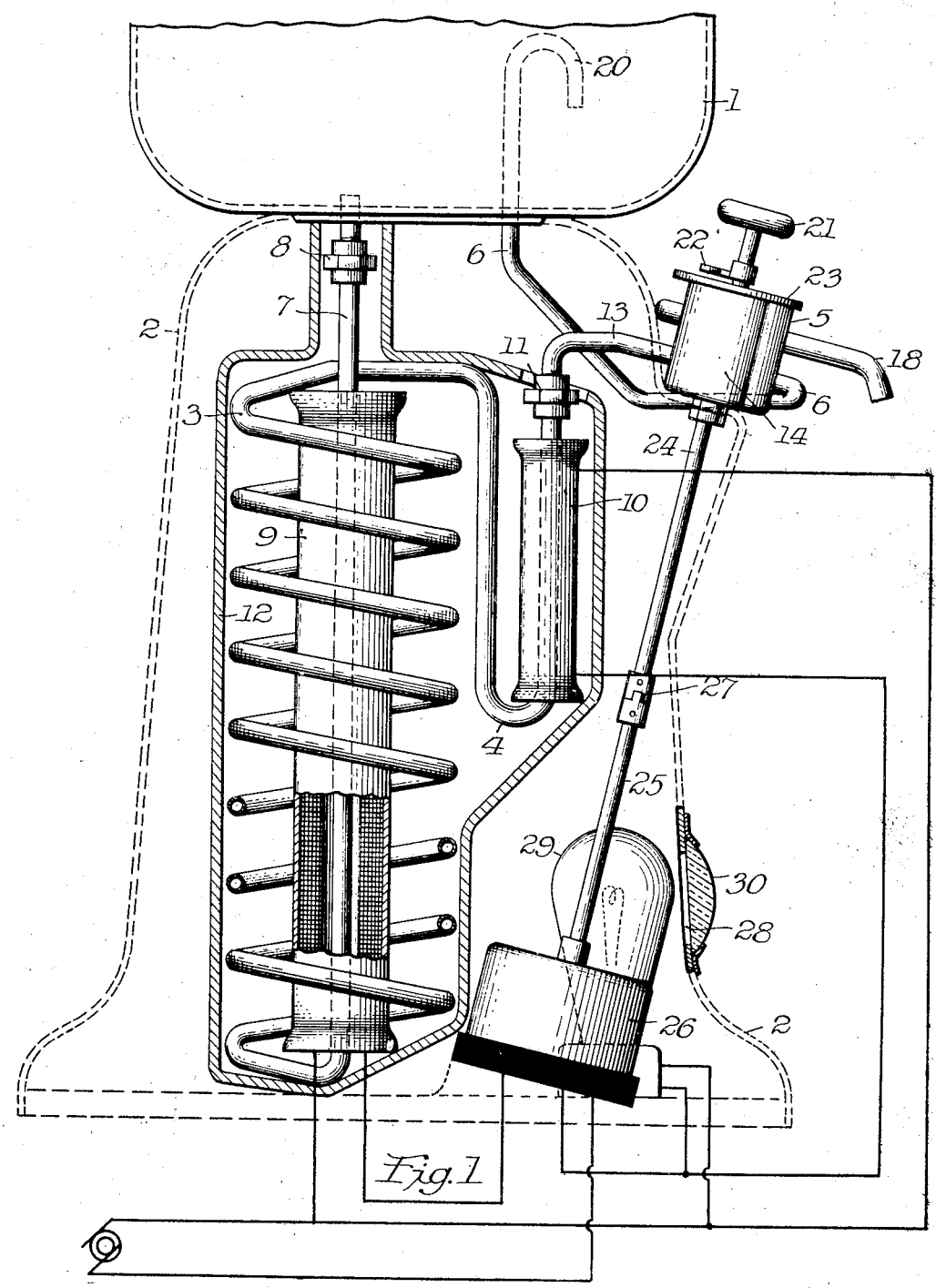

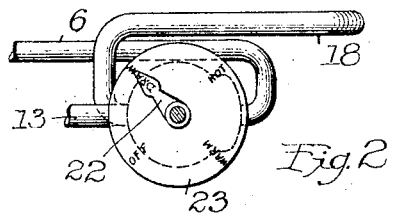
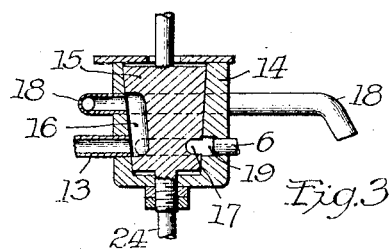
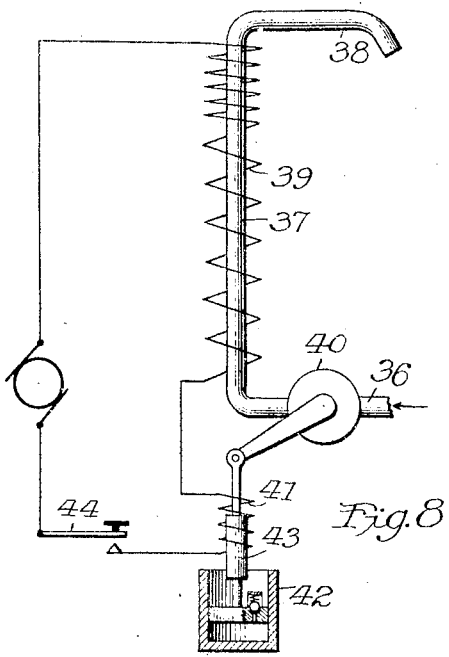
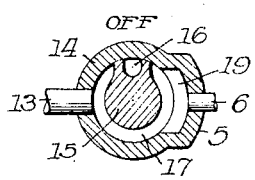
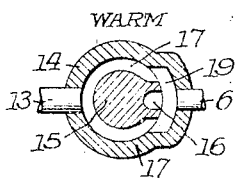
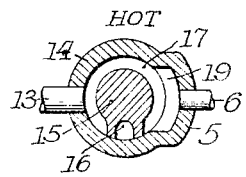
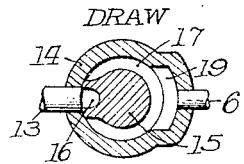
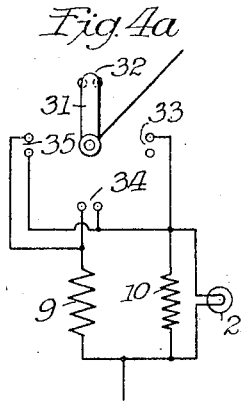
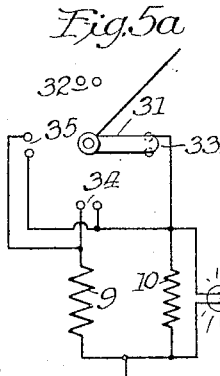
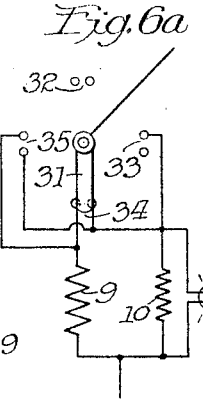
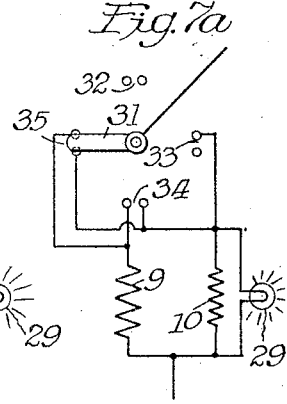

ALFRED HERZ, OF CHICAGO, ILLINOIS.

ELECTRIC WATER-HEATER.

1,190,289. Specification of Letters Patent. Patented July 11, 1916.

Application filed May 24, 1915. Serial No. 29,945.

*To all whom it may concern:*

Be it known that I, ALFRED HERZ, a citizen of the United States, residing at Chicago, in the county of Cook and State of Illinois, have invented a certain new and useful Improvement in Electric Water-Heaters, of which the following is a full, clear, concise, and exact description, reference being had to the accompanying drawings, forming a part of this specification.

This invention relates to electric water heaters and the like.

More particularly my invention provides a heater having a tank or receptacle and a circulatory system with heating means adaptable to heat either the entire content of the tank and the circulatory system or to heat a certain limited quantity of liquid in the circulatory system only.

Water heaters as constructed in the prior art have been designed more with an object of securing efficiency of the heater element than of securing convenience and ease of control of the entire heater mechanism.

The chief object of the present invention is to provide an electric water heater convenient to operate and easy to control.

A further object is to provide a water heater from which it is possible to draw a small amount of hot water or to heat a large amount and to have control over the heater at all times.

It is a still further object to provide a heater having single manual controlling means for both the valve and the heater.

The heater is provided with indicating means for apprising the operator at all times of the condition of the apparatus and the parts are so arranged that the same may easily be taken apart for repairs or the like.

In the accompanying drawings which form a part of the present specification, Figure 1 is a side elevation partly in section of a heater embodying my invention; Fig. 2 is a fragmentary view of the top of the valve showing the indicator for the valve and heater; Fig. 3 is a longitudinal section of the valve; Fig. 4 is a horizontal cross-section of the valve; Fig. 4ª is a diagram of the electrical connection; Fig. 5 shows a different position of the valve, and Fig. 5ª shows a corresponding condition of the electrical connection; Fig. 6 is another position of the valve; Fig. 6ª is a corresponding electrical connection; Fig. 7 is another position of the valve; and Fig. 7ª indicates the corresponding electrical connection; and Fig. 8 is a diagrammatic illustration of a modification.

The heater shown in the accompanying drawings consists of a tank 1 resting upon a base 2 which supports the tank and forms a cover for the circulating system which consists of the worm 3 and the loop 4, connected through the valve 5 and the return pipe 6. The worm 3 is fed from the tank 1 by means of the downpipe 7 fastened to the tank by the union 8, which downpipe is surrounded by the high wattage heater unit 9. The worm 3 is itself placed outside of the heater unit 9 and hence is in such a position as to absorb most of the heat given out by the heating unit. The loop 4 is heated by the low wattage resistance heater unit 10 which is slipped over one leg of the loop before this loop is fastened to the valve 5 at the union 11.

The heaters 9 and 10, which I have shown are of the porcelain tube type, at present on the market, although I do not intend to be limited to the use of such heaters only, since my invention is not concerned with the particular type of heating unit. The heaters 9 and 10 with the corresponding part of the circulatory system are inclosed in a heat insulating jacket 12 as indicated in Fig. 1.

The valve 5 is connected to the loop 4 by a short section of tubing 13 joined to the loop 4 by means of the union 11. The valve 5 comprises a casing or a socket 14 and a corresponding conical plug member 15 having the vertical port 16 and the circumferential port 17. The spigot 18, from which the liquid may be drawn, is connected to the casing 14 at a point directly above the place where the pipe 13 is joined to the casing. The longitudinal port 16 on the plug 15 may be moved to the position shown in Fig. 3 so that the worm and loop are connected to the spigot in order to discharge liquid through these parts. The return circulating tube 6 has a wide port 19 coöperating with the port 17 in the plug 15 such that connection is established between the pipe 13 and the return tube 6 for all positions, except at the position when the liquid is being drawn from the heater.

The return circulating pipe 6 projects into the tank 1 and has its discharge end at a considerable distance above the bottom of the tank 1, having a return bend at 20 for aiding in circulation and for directing the hot water which is discharged therefrom toward the bottom of the tank 1 so as to secure a thorough mixture of the heated water with the water in the bottom of the tank 1 to obtain a uniform temperature of the contents.

The valve 5 is operated by means of the handle 21 to which is connected an indicator pointer 22 movable over a dial 23 for indicating the position of the valve plug and of the electrical switch which is controlled by the movement of the valve. The conical plug 15 of the valve 5 is provided with a stem or extension 24 which is connected to the stem 25 of an electric switch 26 mounted within the base 2 of the heater. The stems 24 and 25 may be continuous or may be formed separate and connected by means of the couplings 27.

At a convenient point in the base an aperture 28 is formed and back of this is placed a pilot lamp 29. A suitable bull's-eye lens or fresnel 30 may be placed over the aperture so that the light from the lamp 29 may be readily perceived at a distance from the heater. The lamp 29 is connected in shunt of the low wattage heater 10 and indicates that current is passing through the heater.

I prefer to construct the switch 26 to be of the snap variety, although the particular type of switch is immaterial as this feature does not form a part of my invention. In Figs. 4ᵃ to 7ᵃ, I have indicated the electrical connections made by the switch 26. A rotating arm 31 which is connected to the source of current is arranged to make contact with the contact pairs 32, 33, 34 and 35 placed 90° apart so as to give four positions of the valve 5 and the switch 26. The heaters 9 and 10 are connected together at one terminal and this terminal is connected to the source of current. The low wattage heater 10 has its other terminal connected to one of the contact points at the three positions 33, 34 and 35 and the high wattage resistance has its free terminal connected to the other points of the pair at the positions 34, 35. It can now be seen that in the position shown in Fig. 4ᵃ, current is cut off completely from the heaters. In the position in Fig. 5ᵃ, current passes through the low wattage heater 10. The signal or pilot lamp 29 which is in shunt of the heater 10 is illuminated and indicates that the heater is in operation. In the positions shown in Figs. 6ᵃ and 7ᵃ, both heaters 9 and 10 are connected in parallel, the lamp 29 being also illuminated. Since the valve 5 and the switch 26 are positively connected together, it can be seen that for each position of the switch a corresponding position of the valve would exist, or vice versa.

It will be noted that the heating tube and the return tube will be connected together in three positions so that circulation will occur at all times except when liquid is being drawn from the heater. At this position the worm and the spigot are connected together and circulation is shut off.

Other arrangements of the valve ports and other arrangements of the switch connections may be made without departing from the spirit of my invention, the above described arrangement being merely an illustrative structure.

It is advisable to have the worm or coil 3 as close as possible to the heating unit 9 to cut down the time lag of heating. By placing the auxiliary heater 10 close to the worm on the main heater a very efficient arrangement is produced.

I have also found in certain types of the heater that it is advisable to use a series parallel arrangement of the heating units 9 and 10 and when the structure is thus arranged, it is possible to tell by the degree of illumination of the lamp 29 whether the heater is working at full capacity or at reduced capacity.

In Fig. 8 I have shown a modification embodying my invention. In this structure the water is drawn from the city mains as by the pipe 36 and no circulation is possible. A tube 37 leading to the spigot 38 is heated by means of a graded resistance heater 39, the degree of heat being increased at the delivery end of the tube 37. The valve 40 which controls the pressure upon the liquid in the tube 37 is controlled by a solenoid 41 which in the present case is connected in series with the heater 39. The solenoid 41 may be connected in parallel with the heater 39 or may be connected in any suitable manner so that when current passes through the heater 39 the solenoid 41 will become active and will tend to open the valve 40. Opening of the valve 40 is delayed by the time element 42 which is shown as a dash-pot arrangement connected to the core 43 of the solenoid. A manual switch 44 closes the circuit of the solenoid 41 and the heater 39. The dash-pot 42 is so timed that the valve 40 will not be opened until the heater 39 has been brought to the proper temperature. In this manner a predetermined quantity of liquid, such as will fill the tube 37, will first be heated and then discharged from the spigot 38. The water entering from the pipe 36 which is under pressure of the city mains discharges the hot water from the spigot 38 and replaces it with cold water which in turn may be heated. The capacity of the heater 39 may be such that hot water will be continuously discharged from the spigot 38 so long as the valve 40 is open, the time interval in such case being only sufficient to bring the heater up to the proper operating temperature. Upon opening of the switch 44 to disconnect the heater, the valve will automatically close.

The arrangement shown in Fig. 8 is particularly efficient and advantageous since the incoming cold liquid expels the hot liquid and refills the heating tube 37. It will also be noted that the valve 40 is on the cold side of the heater so that the same is not subjected to the injurious influence of the hot water. Instead of having an electrical connection between the switch governing the heater and the timing element controlling the valve, I may employ a mechanical connection for effecting the same result.

While I have shown and described particular embodiments of my invention with considerable particularity, I do not intend to be limited to the precise details of construction shown and described.

What I claim as new and desire to secure by Letters Patent of the United States is the following:

1. In combination, a tank, a base for supporting said tank, a tube connected at both ends to said tank, an electric heater surrounding said tube, said tube and said heater being contained in said base, a valve, said tube forming a circulatory system for said tank through said valve, a spigot, an electric switch, and means for operating said valve and said switch simultaneously, said valve having a plurality of circulatory positions and an off position.

2. In combination, a tank, a conduit forming part of a circulatory system for said tank, a spigot, a return conduit for said circulatory system, a valve controlling said spigot and said conduit, a pair of electric heaters for said first conduit, switch means for controlling the connections of said heaters separately, and means for jointly operating said valve and said switching means.

3. In combination, a tank, a base for supporting said tank, a conduit forming part of a circulatory system for said tank supported by and depending from said tank, a valve, a spigot, a return conduit, a pair of electric heaters for said conduit, said conduit and said heaters being contained in said base, a pilot lamp connected to one of said heaters, an indicating lens in said base adjacent said pilot lamp, switch means for controlling the connections of said heaters, and means for jointly operating said valve and said switch means.

4. In combination, a tank, a base for supporting said tank, a down-take tube from said tank projecting into said base, a heater surrounding said down-take tube, a coil connected to said down-take tube and surrounding said heater, a valve, a return circulating tube, and a spigot connected to said valve, a low wattage heater connected between said coil and said valve, an electric switch for controlling said heater, said switch being located in the base, a mechanical connection between said valve and said switch, and means for operating said valve.

5. In combination, a tank, a hollow base supporting said tank, a down-take tube connected to said tank, a high wattage heater surrounding said down-take tube, a coil connected to said down-take tube and surrounding said heater, a valve connected to said coil, a return circulating tube connected to said valve, a spigot for said valve, an electric switch for controlling said heater, and common means for controlling said valve and switch.

6. In combination, a tank, a conduit, a valve, a return conduit, a pair of heaters, a switch having a plurality of positions for controlling the current consumption of the heaters, and an off position, a valve having a plurality of positions for connecting the conduit and the return conduit, and a position for connecting the conduits and the spigot, and a mechanical connection between the valve and the switch for operating the same in unison.

7. In combination a tank, a spigot, a coil for liquids while being heated, heating means, control means for said heating means, said control means having a plurality of predetermined positions, a valve having a plurality of positions for connecting said coil to said spigot or back to said tank and an off position, and a mechanical connection between said control means and said valve.

8. In combination a hollow cylindrical resistance heater adapted to be heated by the passage of current therethrough, a heat conducting tube coiled about said heater and passing through said heater, readily separable unions connected to the outer end of the coil and to the outer end of the tube which passes through said heater, and a valve for controlling the flow of fluid through said tube.

9. In combination a hollow cylindrical resistance heater adapted to be heated by the passage of current therethrough, a heat conducting tube coiled about said heater and passing through said heater axially, a valve for controlling the flow of fluid therethrough and a coupling in said tube at the end of said axial part to allow the heater to be withdrawn from heating relation with said coil.

10. In combination a tank, a base for supporting said tank, a down-take tube from said tank projecting into said base, a heater surrounding said down-take tube, a union in said down-take tube above said heater, a coil connected to said down-take tube and surrounding said heater, a valve connected to said coil, a union in said connection, a return circulating tube and a spigot connected to said valve, an electric switch for controlling said heater, said switch being located in the base, a mechanical connection between said valve and said switch and means for operating said valve.

11. In combination a tank, a circulating tube connected at one end to said tank, heating means for said tube, a spigot, a valve having ports connected to said spigot, said tank and said tube, and having movable means connecting said tank and said tube in a plurality of positions, switching means for said heating means, said switching means having a plurality of control positions corresponding to said valve positions, and a connection between said valve and said switching means.

12. In an electric heater of the class described, a heating vessel for heating liquids, a reservoir for supplying liquid to said vessel, electric supply mains, a plurality of electric heater elements for heating the liquid in said vessel, means for connecting a plurality of said heater elements to said electric supply mains simultaneously and for connecting one of said heating elements to said electric supply mains individually to transfer heat at different rates to the liquid in said vessel, said means including a snap switch having a plurality of switching positions and an off-position, a spigot for withdrawing liquid from said vessel, a valve for controlling said spigot, a rod connecting said valve and said snap switch so that the same are moved to their various positions in unison, said valve having a draw position and an off position immediately thereafter, the off position of said valve corresponding with the off position of said switch.

13. In an electric heater of the class described, a heating vessel for heating liquids, a reservoir for supplying liquid to said vessel, electric supply mains, a plurality of electric heater elements for heating the liquid in said vessel, means for connecting a plurality of said electric heater elements to said mains simultaneously, and for connecting one of said electric heater elements to said mains individually to heat the liquid in said vessel, said means including a switch having a plurality of switching positions and an off position, a spigot for withdrawing liquid from said vessel, a valve for controlling said spigot, said valve being connected mechanically with said switch, said valve having a draw-off position and an off position, said off position corresponding with the off position of said electric switch.

14. In combination, an electric heating element, a snap switch for controlling said element, said switch having an off position for disconnecting the heating element from the electrical supply main, a conduit for discharging liquid heated by said heater, a valve in said conduit, said valve having a closed position, a mechanical connection between said snap switch and said valve, said valve and switch being connected together through said connection so that the off position of the switch concurs with the closed position of the valve, and an indicator for indicating the position of said switch and said valve.

15. In combination, an electric heating element, a snap switch for controlling said switching element, said switch having a plurality of switching positions for governing the connection of said heating element with electrical supply mains, a conduit for discharging liquid heated by said electric heating element, a valve in said conduit, said valve having a plurality of controlling positions, a mechanical connection between said snap switch and said valve, said valve and said switch being connected together so that the controlling positions of the valve coincide substantially with the controlling positions of the switch, and an indicator for indicating the positions of said switch and said valve.

In witness whereof, I hereunto subscribe my name this 21st day of May, A. D. 1915.

ALFRED HERZ.